Jan. 4, 1938.  F. W. COTTERMAN  2,104,189
METHOD OF MOLDING THERMOPLASTICS
Filed April 27, 1935   2 Sheets-Sheet 1
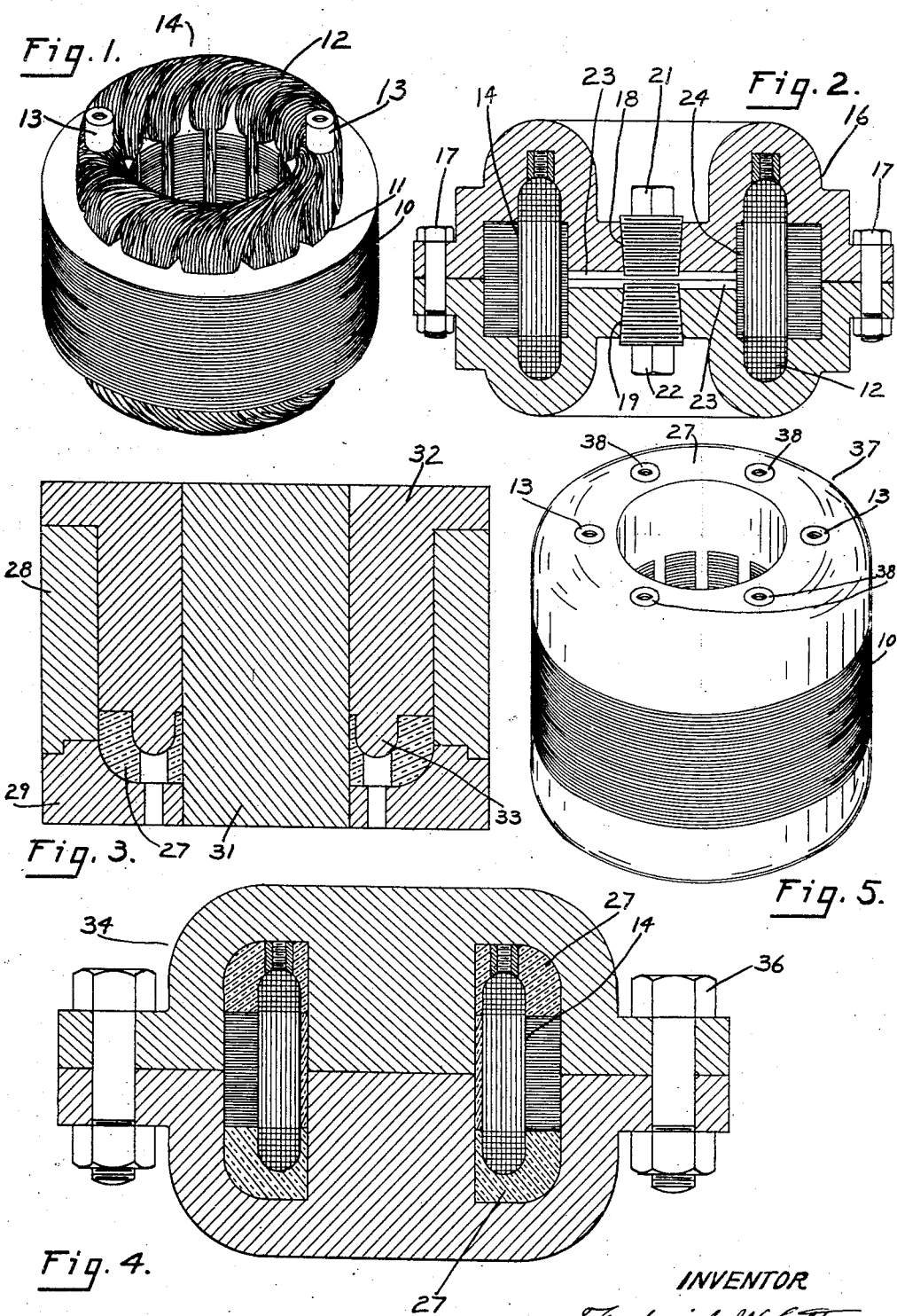
INVENTOR
Frederick W. Cotterman Jan. 4, 1938.  F. W. COTTERMAN  2,104,189
METHOD OF MOLDING THERMOPLASTICS
Filed April 27, 1935  2 Sheets-Sheet 2
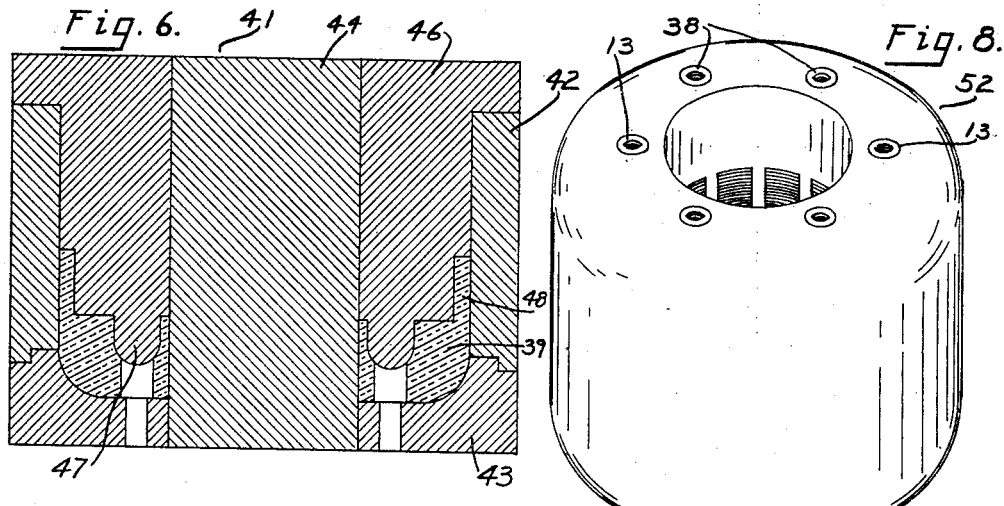
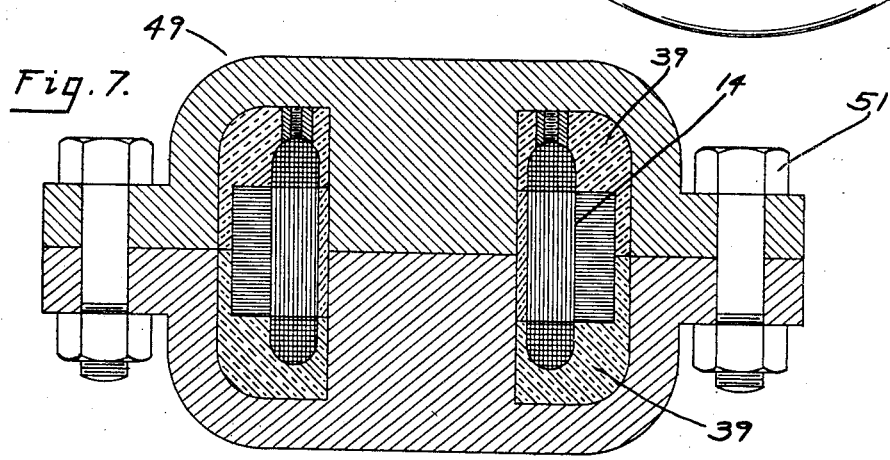
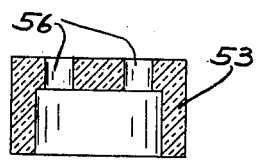
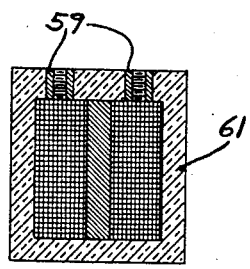
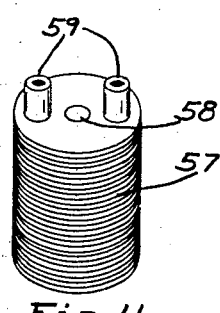
INVENTOR
Frederick W. Cotterman Patented Jan. 4, 1938

2,104,189

UNITED STATES PATENT OFFICE 2,104,189

METHOD OF MOLDING THERMOPLASTICS

Frederick W. Cotterman, Dayton, Ohio, assignor to Bessie D. Apple, Dayton, Ohio

Application April 27, 1935, Serial No. 18,531

8 Claims. (Cl. 18—59)

This invention relates to a method of molding thermoplastics and has particular reference to the molding of shells of such materials around fragile structures.

In molding operations of this character, particularly where shells of insulating material are to be molded around electrical coils, condensers, and similar devices, it would of course be particularly desirable if a material was available in the form of a thin liquid which remained a thin liquid indefinitely under normal conditions of temperature or pressure, but which could by some manner be converted to a homogeneous solid with no reduction in volume.

If such a liquid were now available the molding of an insulation shell around a delicate coil would be a simple matter for then it would only be necessary to place the coil in a mold cavity having space around the coil equal to the desired shell, pump the thin liquid into the mold until the interstices of the coil and the space around it were filled, then convert the thin liquid to a solid. It is apparent that in carrying out such an operation no injury to the coil would result.

But liquid insulating materials of this character are gotten and kept in a liquid state by the admixture of solid matter and a suitable solvent, and in order to convert such material into a solid it is necessary to convert the solvent to a gas and expel it, whereby the resulting structure is either of less cubical dimensions, or, if it is of the same cubical dimensions, then it lacks homogeneity, because the entire volume when hardened necessarily shrinks such an amount as the percentage of solvent which is converted to a gas bears to the percentage of solid matter.

It is because the hereinbefore described ideal liquid insulation is not available that the well known line of thermoplastic molding compounds have come to be used for this purpose, for these compounds may be fluxed and molded to shape and hardened with no reduction in volume occurring from the heat hardening of the insulation after it is molded to shape.

The conventional thermoplastic molding compounds, particularly those comprising a resinous binder and a fibrous filler, in order that a sufficiently dense finished product may be had, are molded to shape under considerable pressure, usually about a ton per square inch, and when shells of such compounds are to be molded around fragile structures, such for instance as comprise wound electrical coils or condensers or other delicate devices, the considerable pressure necessary to the molding of such a shell necessitates some provision for protecting the fragile winding, for otherwise the ton per square inch pressure, required to bring the material in the shell to proper density, would also crush and destroy the winding around which the shell was being molded.

To meet the foregoing situation there has heretofore been developed a process which comprises hardening the winding or other delicate structure around which a shell of plastic compound is to be molded, for instance by pressure-impregnating a winding with a liquid varnish which is of great strength when hardened, then baking the impregnated structure in an oven until the varnish becomes a solid, and repeating the process a considerable number of times or at least until the winding has sufficient crushing resistance to withstand the ton per square inch pressure which the molding of the shell imposes.

But even where coils have been so stiffened or otherwise hardened, considerable difficulty is still encountered in molding a shell of thermoplastic insulation around them, because the molding compounds from which the shells are molded are, when in their unmolded state, from three to seven times the volume that they are when reduced by the ton pressure to sufficient density to constitute a satisfactory finished molding.

In conventional molding practice this large volume of loose material is placed in the mold on the top of the fragile winding around which the shell is to be molded, and the mold is closed and pressure applied to a mold plunger to compact the compound around the winding.

Now this type of compound has a critical period in which it flows freely, but the period is of extremely short duration, and, inasmuch as the mold is closed, it is impossible to tell just when the free flowing period is reached. It therefore often happens that the ton pressure is applied either before the free flowing period is reached or after it has passed, with the result that more or less immobile material is forced against one side of a winding and it is crushed or displaced sufficiently to cause shorts or grounds therein, or, it may happen in a molding where a large mass of the compound is being used, that such part of the compound as is adjacent the hot mold walls will become fluxed and hardened before the portion of the compound remote from the hot mold walls becomes even fluid.

It is therefore the object of the invention to formulate a new procedure which will provide the requisite pressure on the material of the enclosing shell to give it the desired density without placing any undue pressure on the winding or other fragile structure which the shell encloses.

Briefly this new procedure contemplates the compressing of the insulating compound comprising the enclosing shell by super pressure to a dimension at least equal to but preferably less than its final dimension, and to a density at least equal to but preferably greater than its final density, the super pressure being applied in a separate mold but without applying heat at this time to react the compound to harden it, then subsequently placing the compressed but unreacted shell around the winding, and, placing a metal envelope around the shell, then heating the envelope, whereupon the shell fluxes and the gas generated within the envelope expands the fluxed material tightly against the winding and tightly against the walls of the envelope.

The amount of internal gas generated within the envelope may be accurately governed so as not to provide too great pressure on the winding by impregnating the winding with a liquid insulation and only partly drying it, leaving some of the gas within it, or by incorporating a gas producing ingredient in the compound from which the super compressed shells are formed.

The new procedure is hereinafter more fully described, reference being had to the accompanying drawings wherein, Fig. 1 shows the core and winding of a dynamo electric machine stator which I have selected as one illustrative embodiment of my invention.

Fig. 2 shows the core and winding in a forming envelope which I employ for impregnating and shaping the winding.

Fig. 3 shows the mold in which the enclosing shells are preformed.

Fig. 4 shows the core and winding and two of the preformed shells assembled in a baking envelope.

Fig. 5 shows a completed stator.

Fig. 6 is a modification of the preform and mold shown in Fig. 3 and is applicable where both the core and the winding are to be covered.

Fig. 7 shows a core and winding as taken from the forming envelope Fig. 2 assembled with two of the preforms taken from the mold Fig. 6.

Fig. 8 shows a completed stator having both core and coils encased in insulation.

Figs. 9 and 10 show two halves of a shell for encasing a plain coil.

Fig. 11 shows the plain coil which is to be enclosed in the shell Figs. 9 and 10.

Fig. 12 shows the coil Fig. 11 with the completed shell surrounding it.

Similar numerals refer to similar parts throughout the several views.

In the first structure which I have selected to illustrate my invention, the laminated core 10 has a series of slots 11 into which a winding is placed. Winding heads 12 extend beyond the ends of the core, and terminals 13 are electrically connected to the beginning and end of the winding. The complete core and winding assembly as shown in Fig. 1 may be broadly designated by the numeral 14.

In order to bring the winding heads 12 to a definite size and shape, and in order to fill all of the voids within the heads the assembly 14 may next be impregnated with a liquid insulation, and to this end it may be placed in a close fitting forming envelope 16, as shown in Fig. 2. The forming envelope 16 is made in halves and bolted together by bolts 17 to make a pressure tight joint between the halves. Pipe openings 18 and 19 extend into the envelope from the top and bottom respectively and pipe plugs 21 and 22 are provided to close the openings after the winding is impregnated. Grooves 23 extend radially from the openings 18 and 19 to connect them to the main cavity 24 of the envelope.

In order to fill all of the voids in the winding the well known pressure vacuum principle is here employed, that is, with the assembly 14 enclosed in the envelope 16, the plugs 21 and 22 removed, the opening 19 is connected to a vacuum tank, the opening 18 to a tank containing a liquid insulation under pressure, and by manipulation of suitable valves in a manner well known in common practice the air is first exhausted from the winding, then the vacuum shut off then the liquid under pressure left in the envelope until the voids in the winding are filled, after which the mold is disconnected and the plugs 21 and 22 reinserted in the openings 18 and 19 and the envelope and its contents are baked until enough of the solvent with which the insulation is held in solution is expelled to cause the winding heads to maintain their shape when removed from the envelope.

When the core and winding assembly 14 is removed from the forming envelope 16 the interstices of the winding are substantially filled, although the outer surfaces of the coil heads are somewhat rough. This is because in order that the liquid insulation may thoroughly penetrate the winding it is preferably held in solution by a considerable quantity of the solvent, and then of course as the solvent is expelled the volume of the insulation shrinks. But inasmuch as the core and winding assembly 14 fits the envelope 16 so closely, a very small volume of the liquid insulation may enter the envelope, and therefore, although the percentage of shrinkage is considerable, the amount of shrinkage is very small.

The foregoing impregnating operation is performed primarily to fill the voids in the winding and to give the winding heads 12 a definite size and shape, and it is not required that the insulation employed have any great strength. If crevices of any considerable size fail to get filled in the impregnating operation they may be filled up by hand with a quantity of similar material in putty form. The reason that it is important that the voids in the winding be filled is so that no great volume of the thermoplastic material from which the shell is formed in the subsequent operation will be drawn from the shell to fill voids in the winding.

But while I have indicated the pressure vacuum process for filling the voids in the winding, they may be otherwise filled, as by dipping the winding in the impregnating fluid or by applying the fluid to the fibrous covering on the wire before it is wound into coils and placed on the core, but whatever means is employed to apply the impregnating fluid the envelope 16 should be placed around the structure and the insulation dried at least sufficiently to cause the winding to retain the desired shape.

When the structure 14 is removed from the forming envelope 16, not only are the interstices of the winding heads filled but the dimensions of the heads are smaller than they were before they were shaped in the envelope.

Fig. 3 shows a mold 26 in which the shells 27 for covering the winding heads 12 are compressed. Mold 26 comprises a body 28, a base 29, a center plug 31, and a plunger 32. The lower end of the plunger 32 is shaped as at 33 to correspond to the winding heads 12 as they are when taken from the forming envelope 16.

In this mold a large carefully determined volume of thermoplastic insulating compound is placed under the plunger 32 and, by a pressure about ten tons per square inch, is reduced in volume, without heat, to a dimension slightly smaller than would result if the usual pressure of a ton per square inch was applied together with the usual amount of heat.

When the shells 27 are removed from this mold they are of course easily broken and must therefore be carefully handled. Two of the shells 27 are assembled with a wound core 14 in the baking envelope 34, the two halves of which are fastened together by the bolts 36. The cavity of the envelope 34 is just enough larger than the shells as they are when they come from the mold 26, Fig. 3, to permit them to enter freely.

The envelope 34 together with its contents is now placed in an oven and brought to the proper temperature to first flux then react and harden the insulating compound. Because of the intense pressure under which the shells were compressed in the mold 26 and because of the fact that the liquid insulation with which the windings were impregnated was not completely cured, sufficient internal pressure is created to expand the fluxed compound tightly against the walls of the cavity and thereby produce a good finish on the surface of the shells.

The foregoing means of producing internal pressure within the baking envelope, to expand the super compressed shells of insulating compound when they become fluid, by only partly drying the liquid insulation within the winding so that gas is generated by the heating and consequent evaporation of the remaining liquid, is highly satisfactory where the enclosing shell of insulation is being molded around a winding or other fragile structure which may be so impregnated. But there may be certain coils or certain other fragile structures which it is desirable to surround with an enclosing shell of insulation which are either preferably not impregnated or are not susceptible of impregnation, and in all such cases it may become necessary to include a gas forming ingredient in the compound from which the super compressed shells are formed. A suitable ingredient for the purpose may comprise a carefully determined amount of hexamethylenetetramine or paraformaldehyde the amount of the ingredient varying however with the kind of insulation with which it is used.

When the completed stator 37 is removed from the envelope 34 it appears as in Fig. 5. Here the shells 27 have united with the core 10 and the winding heads 12 and surround about the terminal inserts 13. Other metal inserts 38 are placed in the shell 34 but are not connected to the winding. Inserts 38 may be used for fastening suitable end members to the stator.

Instead of covering the winding heads only of the stator as shown in Fig. 5 it may be desirable to cover both the outer surface of the core and the windings, and in Fig. 6 a mold of modified form is shown in which shells 39 are preformed for the purpose. The mold 41 comprises a body 42, a base 43, a center plug 44, and a plunger 46. The lower end of the plunger 46 is shaped as at 47 to correspond to the winding heads 12, Fig. 2, and a cylindrical extension 48 is provided to surround the core 10. This mold, like the mold 26, Fig. 3, is constructed to safely withstand the extraordinary pressure of at least ten tons per square inch, this pressure being applied in making the preformed shells 39.

Two shells 39 are assembled with a wound core 14 in the baking envelope 49, the two halves of which are held together by the bolts 51. The structure is then baked in the same manner as described relative to Fig. 4. When the applied heat fluxes the preformed shells 39 they unite into a single body of insulation which surrounds both core and windings. When the structure is removed it appears as at 52, Fig. 8. The metal inserts 13 and 38 extend from the surface of the insulation body in the same manner as they do in Fig. 5 and for the same purpose.

Fig. 9 shows the upper half 53 and Fig. 10 the lower half 54 of a shell for enclosing a plain coil. Openings 56 are provided in the upper half 53 for the coil terminals. The coil 57 is shown in Fig. 11 wound upon a plain iron core 58 and having terminals 59. Coil 57 is preferably impregnated with a liquid insulation and partly dried out before assembly with the halves 53 and 54 of the shell. It is preferably impregnated and partly dried in a close fitting forming envelope not shown. The shell halves 53 and 54 are molded under about ten tons per square inch in a suitable mold as described relative to Fig. 3 and the halves and coil are assembled and baked in a baking envelope to flux and unite the halves in a single one piece shell 61 as shown in Fig. 12 where the terminals 59 only extend through the surface of the shell.

It will be seen that no part of the procedure hereinbefore disclosed when applied to the making of a stator or a coil has any tendency to crush the winding, for, in the operation performed in the envelope 16, Fig. 2, the insulation, although forced in by pressure, is highly fluid, and therefore acts equally in all directions, having no tendency to displace the windings, while in the operation performed in the envelope 34, the expansion of the shells 27 is just about sufficient to cause the shells to unite with the winding heads and fill the cavity of the envelope closely, so that there is no tendency to displace the winding as there is when it is attempted to mold a shell around a fragile structure by the methods used in common practice.

Believing that the hereinbefore described method of enclosing wound elements, coils and other fragile structures in a dense highly compressed shell of thermoplastic insulation without applying the pressure incident to compressing the shell to the structure which the shell encloses is new and useful.

I claim,

1. The method of making a dynamo electric machine stator which comprises placing a winding on the stator core with winding heads extending axially beyond the ends of the core, filling the voids in the winding with a fluid insulation, holding the winding heads to a definite size and shape in a forming envelope while partly drying out said insulation, removing the forming envelope, cold-molding shells of thermoplastic compound under intense pressure, assembling the shells around the winding heads, placing the assembled structure in a close fitting baking envelope, baking the envelope and contents, then removing the baking envelope.

2. The method of making a dynamo electric machine stator, which comprises placing a winding on the stator core with winding heads extending axially beyond the ends of the core, filling the voids in the winding with a mobile insulation, holding the winding heads to a definite size and shape while partly hardening said insulation, cold-molding shells of thermoplastic compound under a pressure of six or more tons per square inch, assembling the shells around the winding heads, placing the assembled structure in a close fitting baking envelope, baking the envelope and its contents, then removing the baking envelope.

3. The method of making a dynamo electric machine element which comprises winding the element, impregnating the winding with a liquid insulation, holding the winding to a definite size and shape and partly hardening the insulation while the winding is so held, cold molding a shell of thermoplastic compound under a pressure of from six to sixteen tons per square inch, assembling the shell around the winding, placing the assembled structure in a close fitting baking envelope, baking the envelope and its contents, then removing the baking envelope.

4. The method of making a wound electrical device, which comprises winding the device, filling the voids in the winding, forming the winding to a definite size and shape, cold molding a shell of thermoplastic compound under a pressure several times that of the normal hot molding pressure of the compound, assembling the shell around the winding, placing the assembled structure in a close fitting baking envelope, baking the envelope and its contents, then removing the baking envelope.

5. The method of making a wound electrical device, which comprises winding the device, filling the voids in the winding, forming the winding to a definite size and shape, cold molding a shell of thermoplastic compound under pressure to bring it to a size slightly smaller than when molded at its normal hot molding pressure, assembling the shell around the winding, placing the structure in a close fitting envelope, baking the envelope and its contents, then removing the baking envelope.

6. The method of hermetically sealing a wound electrical device in a shell of insulation, which consists of completely filling all voids in the winding with insulating fluid containing a solvent, pressing the winding to a definite size and shape in a forming envelope, applying heat to the forming envelope to solidify the fluid and to convert a portion of the solvent into a gas and expel it from the winding, arresting the heat before all of the solvent is expelled, thereby leaving a portion of the solvent in the winding, molding a shell of dry thermo-plastic thermo-setting insulating compound by heavy pressure and without heat to a dimension slightly smaller than the desired finished dimension, placing the shell around the wound device, placing the assembled shell and device in a close fitting envelope, applying heat to the envelope to convert the remainder of the solvent to a gas and to soften the compound comprising the envelope, whereby the gas expands the softened shell tightly into the close fitting envelope, maintaining the heat until the shell hardens in its expanded state, then removing the envelope.

7. The method of encasing a winding in a shell of insulation, which comprises molding a hollow shell of finely comminuted thermo plastic thermo setting insulating compound in two halves in a mold under a pressure sufficient to bring it to a size slightly smaller than its finished size without applying heat, placing the halves of the shell around the winding, placing the winding and shell assembly in a relatively close fitting baking envelope, heating the envelope until the compound fluxes and unites the two halves in a single shell and expands to fit the envelope more closely, maintaining the heat until the compound sets, then removing the structure from the baking envelope.

8. The method of enclosing a fragile structure in a shell of thermo plastic thermo setting insulation of the character requiring molding under heavy pressure and high heat, which consists of molding the shell in parts under heavy pressure and without applying heat, assembling the parts of the shell around the fragile structure, placing the assembled structure in a close fitting baking envelope having inner dimensions exactly that of the finished article, applying heat without pressure until the compound fluxes and unites the several parts and expands to fit the envelope more tightly, maintaining the heat until the compound sets, then removing the finished article from the baking envelope.

FREDERICK W. COTTERMAN.